July 1, 1924.
A. BECK
DISH DRIER
Filed Feb. 4, 1922
2 Sheets-Sheet 1
1,499,903
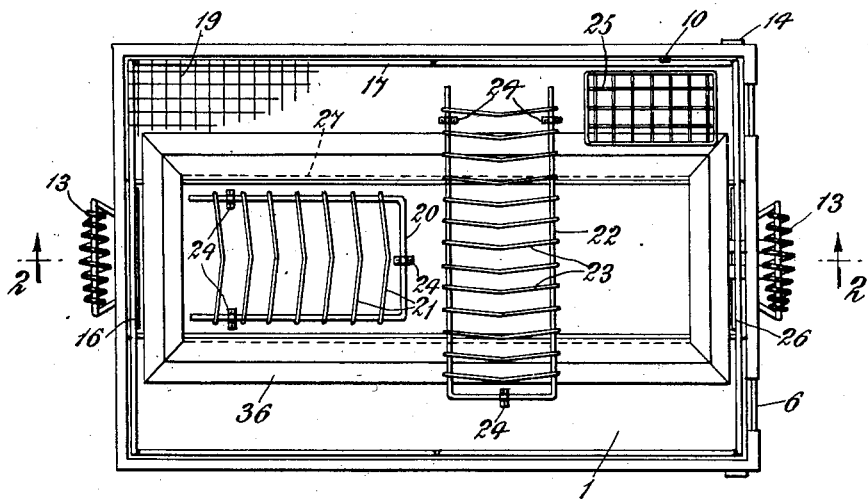
Fig. 1
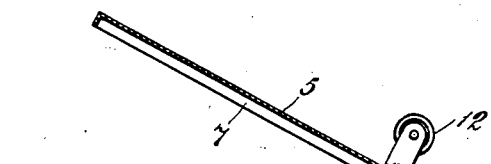
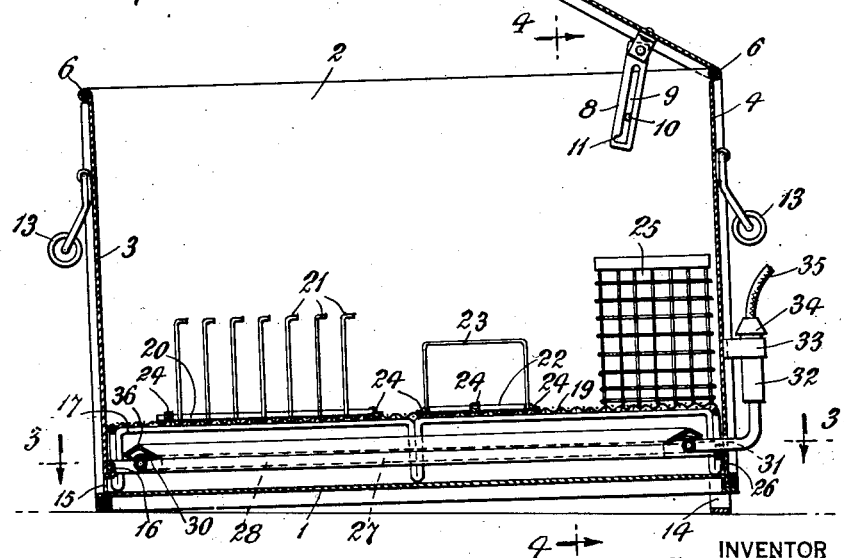
INVENTOR
Adolph Beck
BY Townsend & Llecher
ATTORNEYS.

July 1, 1924.
A. BECK
DISH DRIER
Filed Feb. 4, 1922  2 Sheets-Sheet 2
1,499,903
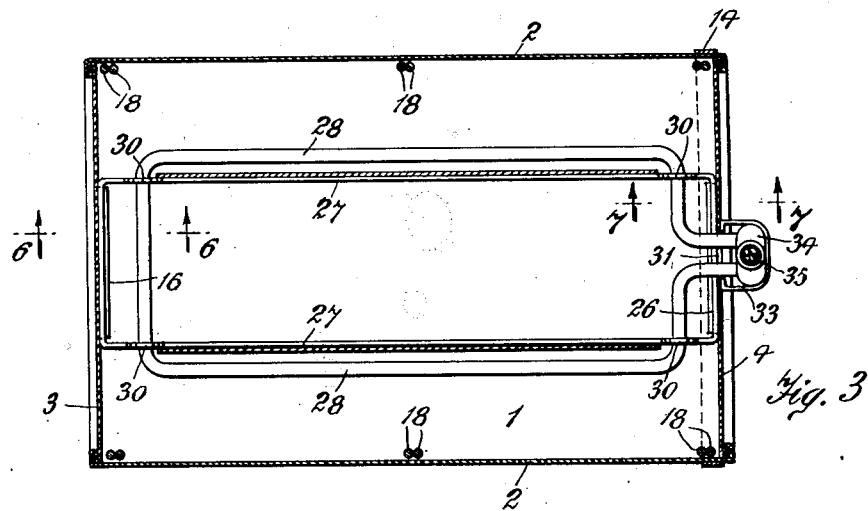
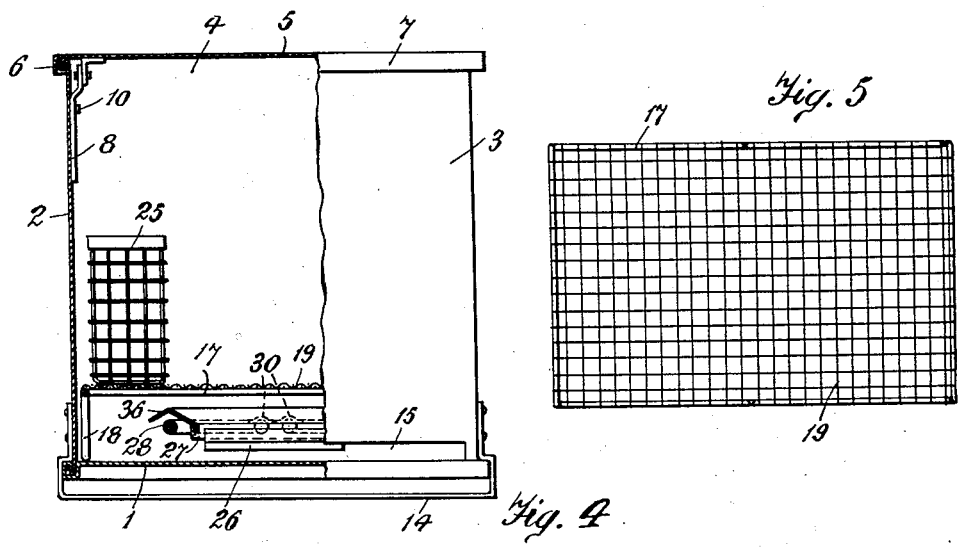
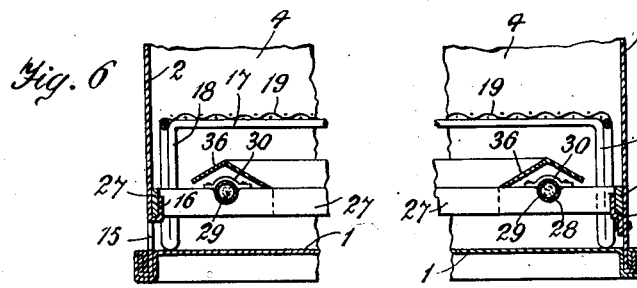
INVENTOR
Adolph Beck
BY
Townsend + Decker
ATTORNEYS.

Patented July 1, 1924.

1,499,903

UNITED STATES PATENT OFFICE.

ADOLPH BECK, OF BROOKLYN, NEW YORK.

DISH DRIER.

Application filed February 4, 1922. Serial No. 534,026.

*To all whom it may concern:*

Be it known that I, ADOLPH BECK, a citizen of the United States, and a resident of Brooklyn, in the county of Kings and State of New York, have invented certain new and useful Improvements in Dish Driers, of which the following is a specification.

My invention has for its object the production of a device of simplicity of construction by the use of which dishes or silverware or other analogous objects may be expeditiously warmed or thoroughly and quickly dried after being washed.

The device may be operated at small cost and is a great labor-saving one. By its use one of the evils ordinarily necessary in the routine work of the household is eliminated, that is, the manual drying of dishes and silverware. When the device is used as a drier the washed dishes and silverware are placed on suitable holders or racks within the drier which holds them in such a position that they will drain while warm dry air circulates through the drier and removes the remaining moisture from the objects. This operation leaves the objects with bright polished surfaces without any foreign substances adhering thereto and thus eliminates an objection of drying with a cloth whereby lint from the cloth is not infrequently left on the dried objects.

The invention consists in the details of construction and the novel parts and combinations thereof hereinafter more particularly described and then specified in the claims.

In the accompanying drawings showing a practical embodiment of the invention:

Fig. 1 is a plan view of my improved device showing the cover removed.

Fig. 2 is a horizontal section on the line 2—2 of Fig. 1.

Fig. 3 is a horizontal section on the line 3—3 of Fig. 2.

Fig. 4 is a vertical section on the line 4—4 of Fig. 2.

Fig. 5 is a plan view of the drain stand.

Fig. 6 is a horizontal section on the line 6—6 of Fig. 3.

Fig. 7 is a horizontal section on the line 7—7 of Fig. 3.

Referring in detail to the several figures of the drawing:

1 indicates the base of a box or casing, 2 the side walls thereof, 3 the front wall, 4 the rear wall and 5 the lid or cover, all of which parts may be constructed of any suitable metal or other material. In order to give the box strength the side walls and front and rear walls are connected to the base by lapped joints as indicated, while the upper edges of the side walls, front and rear walls are reinforced with a wire 6 around which the edges are rolled, thereby also eliminating a sharp cutting edge which might injure or cut the hands. The cover 5 is also provided with flanges 7 adapted to fit over said rolled edges but not tightly so that air may escape from the casing or flow therein for ventilation purposes. The rear side of the cover 5 is hinged to the casing in any desirable manner, said cover being provided with a supporting bar 8 pivotally fastened therebeneath and having a slot 9 therein receiving a pin 10 which is carried by one of the side walls 2. Said slot 9 communicates with a notch 11 within which the pin 10 extends when the cover is opened, this permitting the cover to be held in open position against the action of gravity until movement of said bar 8 to release the pin from the notch 11. A ventilated handle 12 comprising a coiled wire which will resist a tendency to become heated is secured to the cover in any desired manner for assisting in the raising thereof while similar handles 13 of like construction are pivoted to the front and rear walls of the casing, whereby the device as a unit may be readily lifted.

Pivoted to the side walls 2 adjacent the rear end thereof is a support 14 whereby the casing as a whole may be tilted at an angle to the horizontal to cause any water therein to run through a slot 15 extending across the entire width of the front wall of the box adjacent the lower end thereof, said slot also forming an opening for the purposes of ventilation. Said slot 15 is formed by cutting out the material of the front wall, a portion of the material then being bent into the form of a bracket 16 for a purpose to be presently described.

The drain stand comprises a rectangular frame 17 of heavy wire provided with legs 18 forming a part of said frame for supporting the same. Wire mesh 19 is stretched over the frame and fastened to it. The drain stand is removable for the purposes of cleaning and it merely rests loosely on the base of the casing within the same. All of the parts of said stand are preferably tinned to prevent corroding.

20 indicates a U-shaped wire forming the base of a rack or holder which base has the ends of U-shaped wire crossing members 21 welded thereto to form compartments for plates which may be slipped therein. The base of a similar rack or holder is indicated at 22 and the crossing members thereof at 23. Both of said racks may be placed on the drain stand in any desired position to suit the convenience and they may be, if so desired, detachably secured to the wire mesh 19 of said drain stand by suitable clips 24. I have also provided a silverware rack 25 for holding silverware such as knives, forks, spoons, etc., therein in an upright draining position. This silverware rack comprises a wire basket constructed of square wire mesh and it may be placed in any desired position within the casing and detachably fastened to the wire mesh 19 of the drain stand by suitable clips. All of the racks are preferably tinned to obviate danger of corrosion.

The rear wall of the casing has bolted or otherwise secured thereto a bracket 26 which, together with the bracket 16 hereinbefore described, removably receives a rectangular-shaped frame 27 forming a heater support. The heater which is indicated at 28 comprises a heating element wound in a helical coil which is encased in metal tubing, the heating element being insulated from the tubing by a refractory material. Said heater rests or is supported in suitable grooves 29 with which the heater support is provided and it may be held in position by suitable clamps 30 engaging said heater and secured to said heater support. The ends or terminals of said heater extend through a slot 31 in the rear wall of the casing, which slot also acts as an opening for ventilation purposes, said terminals being connected to a box 32 carried by a bracket 33 fastened to the rear wall of the casing. Said box receives a plug 34 to which is electrically connected a cord 35 which cord may be connected to a source of current supply as an ordinary lighting circuit. The purpose of using a heater of the type described is that the drain water from the dishes to be dried, even though it falls thereon, will not actually contact with the heating element thus obviating the danger of grounding the circuit.

When the device is to be used the various parts are in the position best shown in Fig. 3 although the exact location of the various racks on the drain stand is immaterial. The plates and silverware after being washed are slipped or placed within their respective racks, the cover 5 is closed and the current turned on to heat the heater. Any drain water from the objects being dried flows through the wire mesh 19 to the bottom of the casing and then through the opening 15 as the casing is tilted at an angle as above explained. Intense heat is generated in the heater and the heated air flows upwardly through the wire mesh 19 and dries the objects in a remarkably short space of time. In some cases I have found that the heat from the heater is so intense that there is danger of the dishes becoming cracked. I have accordingly provided a deflector plate which is indicated at 36 and which extends over the heater and is fastened to the heater support 27 in any desired manner. This deflector plate has the function of deflecting the heat from the heater downwardly before it rises and contacts with the objects to be dried.

My improved device may be used both as a drier and a heater as above explained and it is particularly desirable in that the interior parts may be expeditiously removed for cleaning purpose. It will be understood, furthermore, that various modifications in the construction may be made without departing from the spirit of the invention as set forth in the appended claims.

What I claim as my invention is:—

1. In a device of the character described, a casing, a drain stand provided with openings mounted in said casing, a rack supported by said drain stand for holding articles and an encased heater beneath said drain stand and within said casing whereby the heated air may flow freely from said heater to said rack, said heater being adapted to be connected with a source of current supply.

2. In a device of the character described, a casing provided with a ventilating opening therein, a drain stand having a covering of wire mesh, an open wire rack supported by said drain stand for holding articles and an insulated heater beneath said drain stand adapted to be connected with a source of current supply.

3. In a device of the character described, a casing provided with a draining opening adjacent its base, a cover for said casing, means carried by said casing for supporting the same at an angle to the horizontal, a removable drain stand within said casing, means on said drain stand for holding articles and an insulated heater beneath said drain stand adapted to be connected to a source of current supply.

4. In a device of the character described, a casing, a drain stand therein provided with a wire mesh covering the same, an open rack on said drain stand for holding articles, a heater support beneath said wire mesh and a heater on said support whereby the heated air may flow freely from said heater, through said mesh and to said rack, said heater being adapted to be connected to a source of current supply.

5. In a device of the character described, a casing, a drain stand comprising a wire frame having legs adapted to engage the base of said casing and a wire mesh stretched over said frame and secured thereto, a heater support beneath said frame and a heater detachably clamped to said support and adapted to be connected with a source of current supply.

6. In a device of the character described, a casing, a drain stand comprising a wire frame having legs adapted to engage the base of said casing and a wire mesh stretched over said frame and secured thereto, a wire rack adapted for holding dishes and detachably secured to said wire mesh, a wire basket for holding silverware and detachably secured to said wire mesh, a heater support detachably held to said casing beneath said wire mesh and an insulated heater on said support adapted to be connected with a source of current supply.

7. In a device of the character described, a casing, a drain stand on said casing having openings therein, a rack on said drain stand for holding articles, a heater support beneath said drain stand, a heater on said support adapted to be connected to a source of current supply and a deflector associated with said heater support and extending over said heater.

8. In a device of the character described, a casing, a drain stand on said casing having openings therein, a rack on said drain stand for holding articles, brackets on said casing, a heater support held by said brackets beneath said drain stand, a heater on said support and extending through said casing and adapted to be connected to a source of current supply and a deflector for deflecting the heat downwardly from said heater.

9. In a device of the character described, a casing, a drain stand mounted therein, a rack above said drain stand for holding articles and an encased heater beneath said drain stand whereby the heated air may flow freely from said heater to said rack, said heater being adapted to be connected to a source of current supply.

10. In a device of the character described, a casing, a drain stand in said casing, a rack on said drain stand for holding articles, a heater within said casing and a deflector associated with said heater.

Signed at New York, in the county of New York and State of New York, this 3rd day of February, A. D. 1922.

ADOLPH BECK.

Witnesses:
F. B. TOWNSEND,
GEORGE E. BROWN.